United States Patent
Jung et al.

(10) Patent No.: US 11,851,175 B2
(45) Date of Patent: Dec. 26, 2023

(54) PROPELLER TILTING APPARATUS FOR AIR MOBILITY

(71) Applicants: Hyundai Motor Company, Seoul (KR); Kia Corporation, Seoul (KR)

(72) Inventors: Sang Hyun Jung, Hwaseong-si (KR); Kyu Hoon Cho, Suwon-si (KR); Chung Sik Yim, Anyang-si (KR); Jae Young Choi, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 306 days.

(21) Appl. No.: 17/375,971

(22) Filed: Jul. 14, 2021

(65) Prior Publication Data
US 2022/0169373 A1 Jun. 2, 2022

(30) Foreign Application Priority Data
Nov. 27, 2020 (KR) .................... 10-2020-0162345

(51) Int. Cl.
*B64C 29/00* (2006.01)
*B64D 27/24* (2006.01)

(52) U.S. Cl.
CPC .......... *B64C 29/0033* (2013.01); *B64D 27/24* (2013.01)

(58) Field of Classification Search
CPC ..... B64C 27/28; B64C 27/52; B64C 29/0033; B64U 30/297; B64D 27/24
See application file for complete search history.

(56) References Cited

U.S. PATENT DOCUMENTS

| | | | | |
|---|---|---|---|---|
| 2019/0337615 | A1* | 11/2019 | Min | B64C 29/0091 |
| 2020/0148347 | A1* | 5/2020 | Bevirt | B64D 27/24 |
| 2021/0107639 | A1* | 4/2021 | Hymer | B64C 29/0033 |

FOREIGN PATENT DOCUMENTS

KR 10-2020-0104582 A 9/2020

* cited by examiner

*Primary Examiner* — Elton K Wong
(74) *Attorney, Agent, or Firm* — MORGAN, LEWIS & BOCKIUS LLP (57) ABSTRACT

A propeller tilting apparatus of air mobility may include a guide bracket configured to extend in forward and rearward directions; a sliding mechanism provided in the guide bracket to be movable in the forward and rearward directions, and including a driving motor configured to generate rotation force, and a power conversion unit connected to the guide bracket and configured to convert the rotation force of the driving motor into rectilinear motion of the sliding mechanism; and a tilting mechanism engaged to the power conversion unit to be moved together with the sliding mechanism, and including a propeller motor configured to be tilted in the upward and downward directions, and an angle conversion unit connected to the propeller motor and the power conversion unit to tilt the propeller motor using the rotation force transmitted from the power conversion unit.

14 Claims, 5 Drawing Sheets

PROPELLER TILTING APPARATUS FOR AIR MOBILITY

CROSS-REFERENCE TO RELATED APPLICATION

The present application claims priority to Korean Patent Application No. 10-2020-0162345, filed on Nov. 27, 2020, in the Korean Intellectual Property Office, the entire contents of which is incorporated herein for all purposes by this reference.

BACKGROUND OF THE INVENTION

Field of the Invention

The present invention relates to a propeller tilting apparatus for air mobility, and more particularly to a propeller tilting apparatus for air mobility which tilts a propeller depending on the flying mode of an aircraft fuselage.

Description of Related Art

Recently, air mobility which is usable in various fields, such as cargo containers, medical transports, etc., is progressing, and method for improving energy efficiency and stabilization of air mobility has been developed and are in a process of being implemented in practice.

Such air mobility refers to air transportation systems which fly by changing the orientation of a propeller, and thereby vertically take off and land. A propeller for air mobility is configured to be tilted depending on the flying mode of an aircraft, and thus the angle of the propeller varies in hovering, in which the aircraft takes off and lands vertically, and in cruising, in which the aircraft flies forwards. However, when the propeller is switched to a horizontal state and thus interferes with the wings of the aircraft or parts, such as a boom, in hovering, thrust loss due to rotation of the propeller is caused. To solve the present problem, the propeller is configured to be spaced from the fuselage of the aircraft, but in the instant case, the unnecessarily long distance between the propeller and the aircraft fuselage causes additional problems.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a propeller tilting apparatus of air mobility which simultaneously performs rectilinear movement of a propeller in the forward and rearward directions and change in the angle of the propeller using one motor to achieve structural simplification and reduce thrust loss at the position of the propeller depending on the flying mode.

In accordance with various aspects of the present invention, the above and other objects may be accomplished by the provision of a propeller tilting apparatus of air mobility, including a guide bracket configured to extend in forward and rearward directions, a sliding mechanism provided in the guide bracket to be movable in the forward and rearward directions, and including a driving motor configured to generate rotation force, and a power conversion unit connected to the guide bracket and configured to convert the rotation force of the driving motor into rectilinear motion, and a tilting mechanism engaged to the power conversion unit to be moved together with the sliding mechanism, and including a propeller motor configured to be tilted in the upward and downward directions, and an angle conversion unit connected to the propeller motor and the power conversion unit to tilt the propeller motor using the rotation force transmitted from the power conversion unit.

A guide rail configured to extend in the forward and rearward directions may be provided in the guide bracket, and the driving motor of the sliding mechanism may be mounted on the guide rail to be slidable, and may be moved along the guide rail.

The power conversion unit may include nut portions fixed to the guide bracket, and a screw portion configured to extend from the driving motor along the guide bracket, to penetrate the nut portions and then to be connected to the angle conversion unit.

The tilting mechanism may further include a movable bracket provided on the guide bracket by the angle conversion unit connected to the power conversion unit to be rectilinearly moved in the forward and rearward directions, and a tilting bracket configured such that the propeller motor is mounted thereon, and provided on the movable bracket by the angle conversion unit such that an angle of the tilting bracket is changed.

Guide rods configured to extend in the forward and rearward directions may be provided at sides of the guide bracket, and the movable bracket may be mounted on the guide rods 120 to be slidably movable therealong.

A width of the movable bracket in a lateral direction may be greater than a width of the guide bracket in the lateral direction and thus, the movable bracket may be spaced from the guide bracket when the movable bracket is moved forwards, and may be inserted into the guide bracket to overlap the guide bracket when the movable bracket is moved rearwards thereof.

The angle conversion unit may include a worm screw configured to be rotated by the rotation force transmitted from the power conversion unit, and a worm wheel configured to be engaged with the worm screw and to be coupled to the tilting bracket to change the angle of the tilting bracket when the worm wheel is rotated due to rotation of the worm screw.

The worm screw may be rotatably provided on the movable bracket and coupled to the power conversion unit to be rotated simultaneously with the power conversion unit.

A center shaft configured to extend from a center portion of the worm wheel may penetrate the tilting bracket and be integrally coupled to the tilting bracket, and the center shaft may penetrate the movable bracket and be rotatably mounted on the movable bracket.

The worm wheel may be engaged with the worm screw in a state in which the worm wheel is located on the worm screw.

The tilting mechanism may be configured such that the propeller motor is disposed vertically when the sliding mechanism is inserted into the guide bracket, and the propeller motor is disposed horizontally when the sliding mechanism is withdrawn from the guide bracket, and accordingly, a direction in which thrust is generated by operation of the propeller motor may be changed.

The guide bracket may be provided on a wing of an aircraft fuselage, a propeller including a plurality of propeller blades may be provided on the propeller motor, and the propeller of the tilting mechanism may be configured to be spaced from the wing of the aircraft fuselage when the sliding mechanism is withdrawn from the guide bracket.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Reference will now be made in detail to the exemplary embodiments of the present invention, examples of which are illustrated in the accompanying drawings. Wherever possible, the same reference numbers will be used throughout the drawings to refer to the same or like parts.

Hereinafter, a propeller tilting apparatus of air mobility according to various exemplary embodiments of the present invention will be described with reference to the accompanying drawings.

Figure 1:
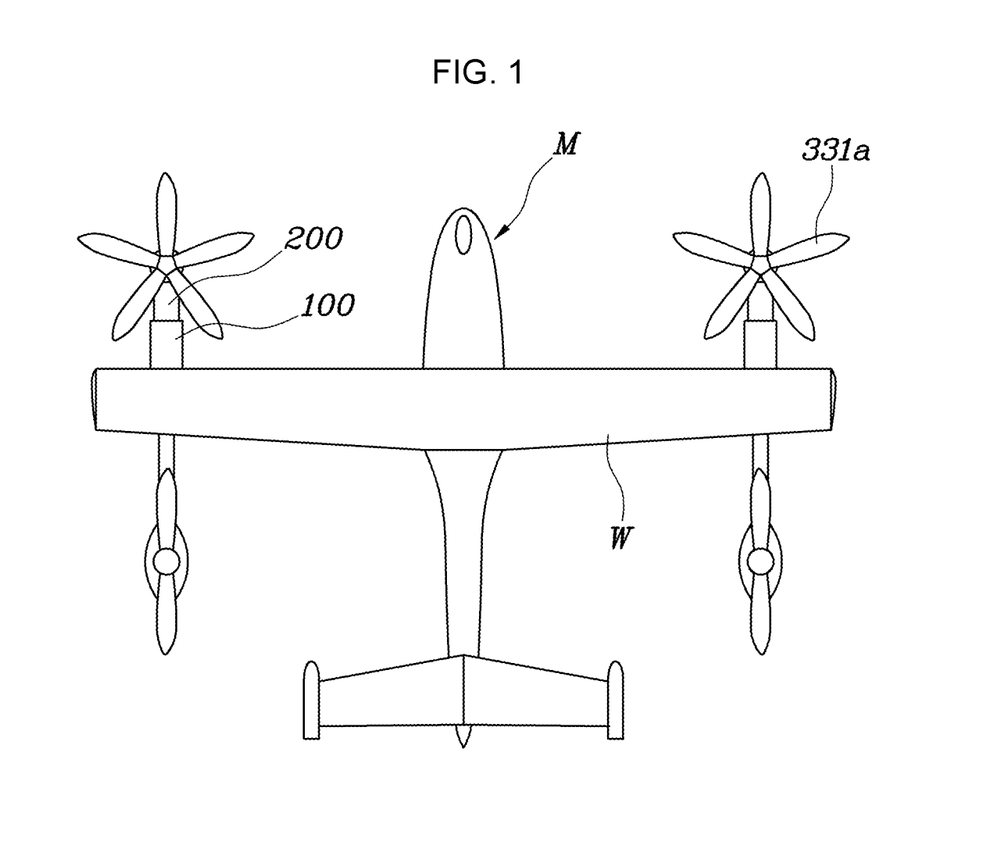
FIG. 1 is a view exemplarily illustrating an aircraft according to various exemplary embodiments of the present invention.
Figure 2:
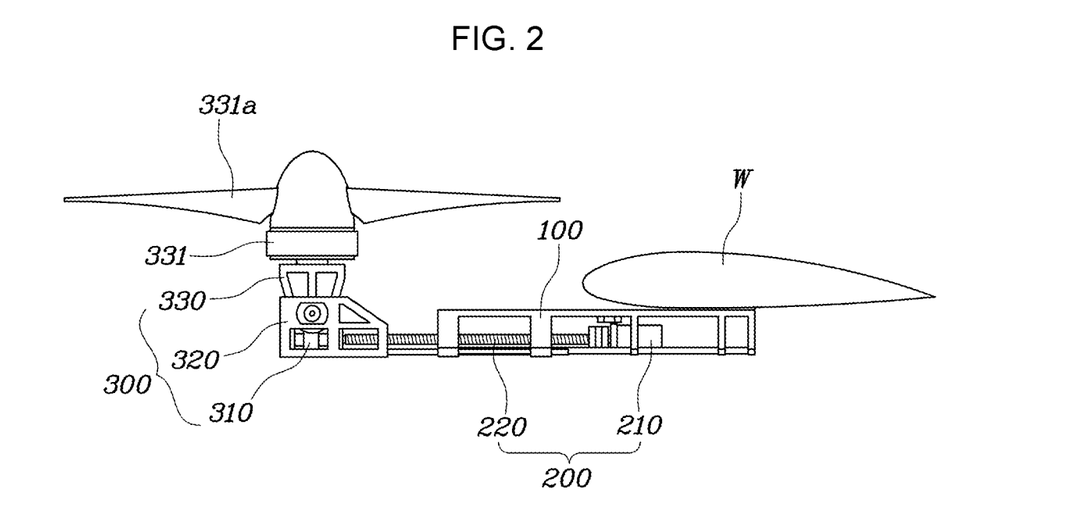
FIG. 2 and FIG. 3 are views exemplarily illustrating a propeller tilting apparatus of air mobility according to various exemplary embodiments of the present invention.
Figure 3:
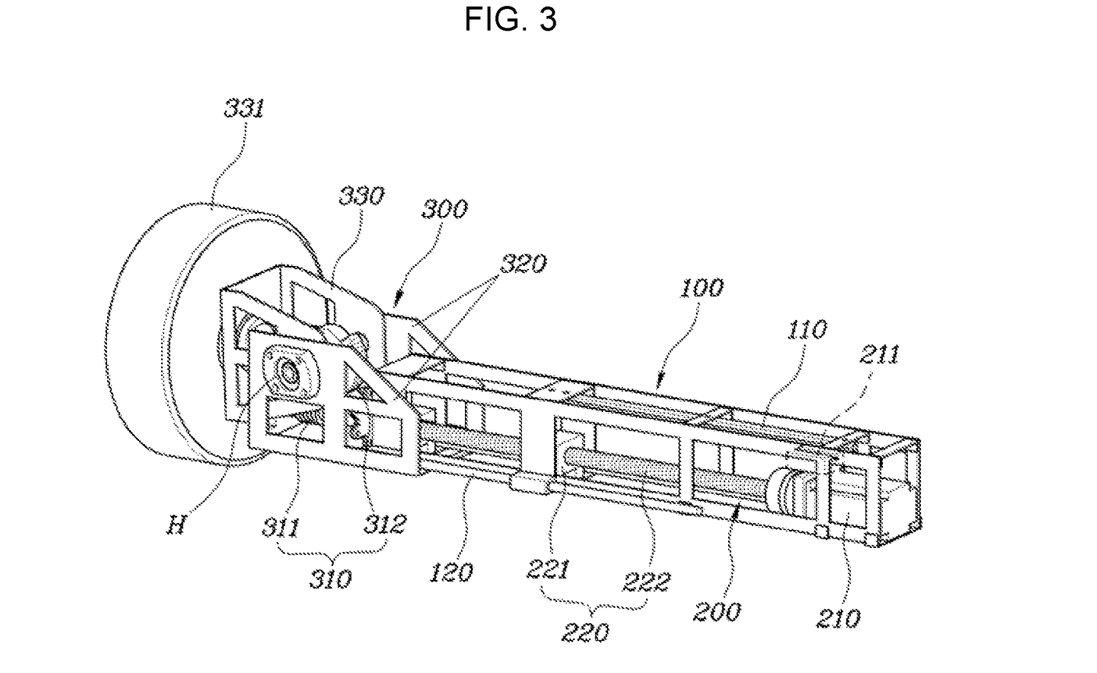
Figure 4:
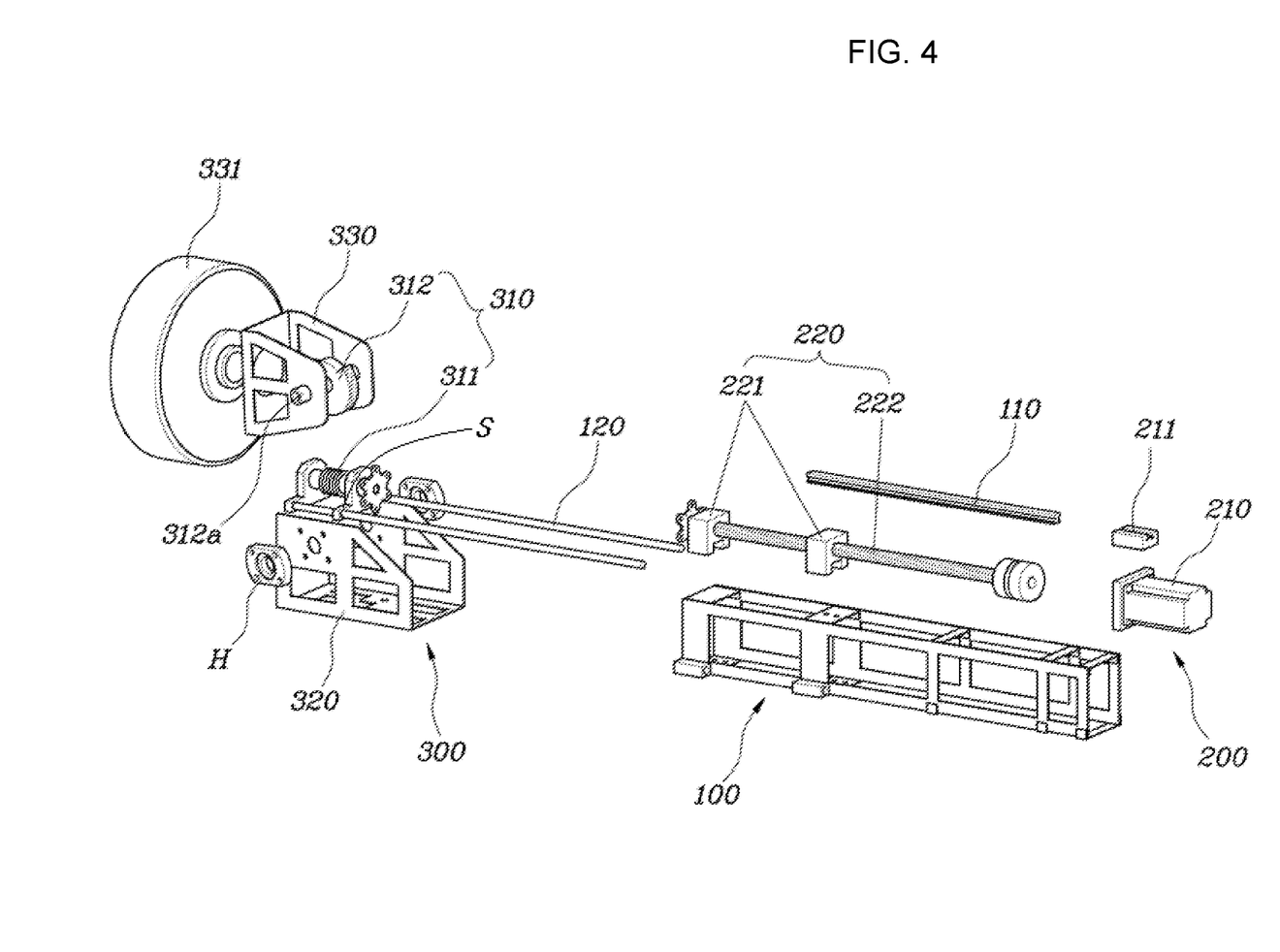
FIG. 4 is an exploded perspective view of the propeller tilting apparatus of air mobility shown in FIG. 2.
Figure 5:
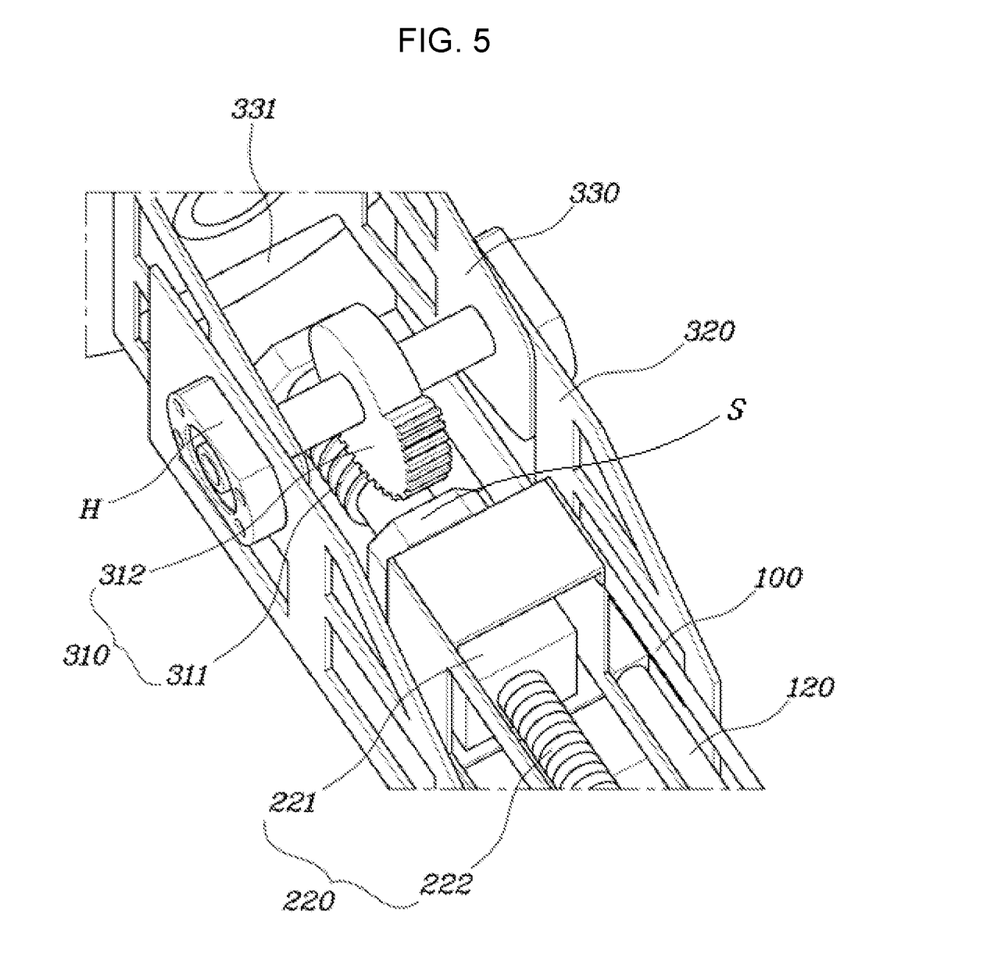
FIG. 5 is a perspective view exemplarily illustrating a tilting mechanism of the propeller tilting apparatus of air mobility shown in FIG. 2.
Figure 6:
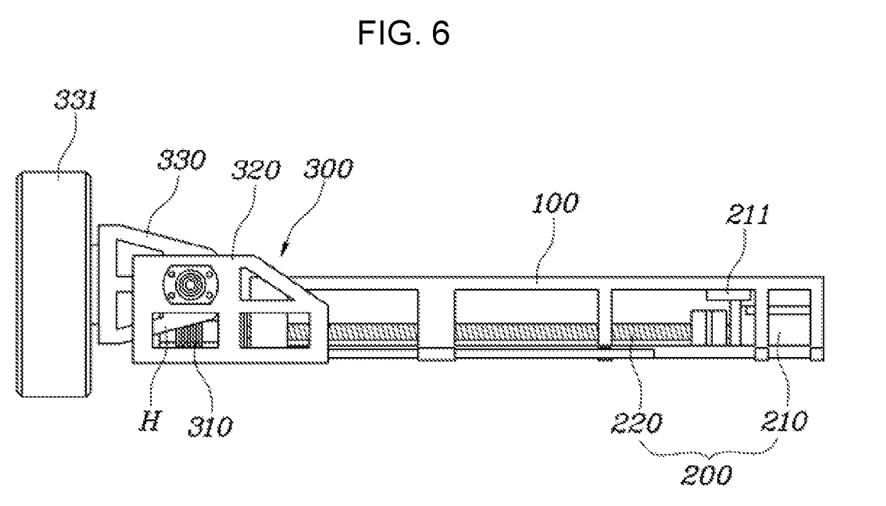
FIG. 6 and FIG. 7 are views exemplarily illustrating operating states of the propeller tilting apparatus of air mobility shown in FIG. 2.
Figure 7:
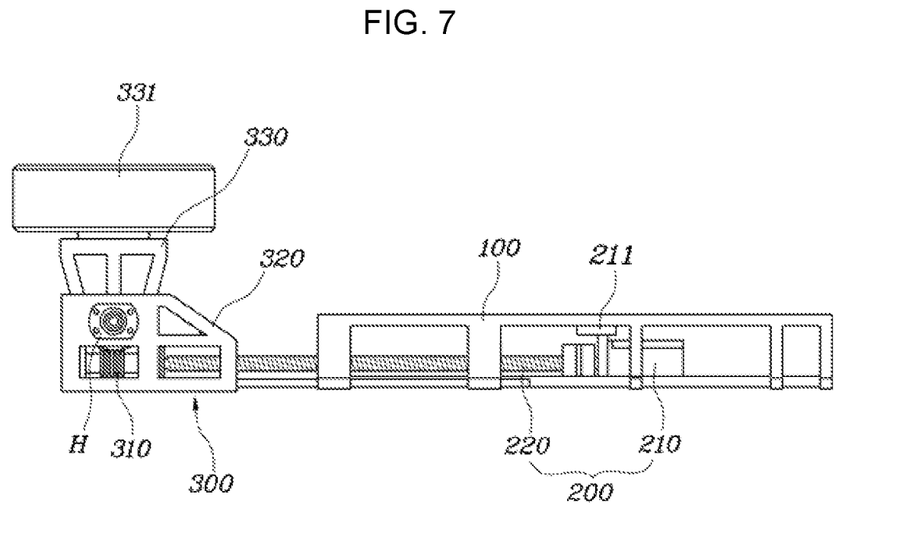

FIG. 1 is a view exemplarily illustrating an aircraft according to various exemplary embodiments of the present invention, FIG. 2 and FIG. 3 are views exemplarily illustrating a propeller tilting apparatus of air mobility according to various exemplary embodiments of the present invention, FIG. 4 is an exploded perspective view of the propeller tilting apparatus of air mobility shown in FIG. 2, FIG. 5 is a perspective view exemplarily illustrating a tilting mechanism of the propeller tilting apparatus fir air mobility shown in FIG. 2, and FIG. 6 and FIG. 7 are views exemplarily illustrating operating states of the propeller tilting apparatus of air mobility shown in FIG. 2.

The propeller tilting apparatus of air mobility according to various exemplary embodiments of the present invention includes, as shown in FIG. 1, FIG. 2, FIG. 3, and FIG. 4, a guide bracket 100 configured to extend in the forward and rearward directions, a sliding mechanism 200 provided in the guide bracket 100 to be movable in the forward and rearward directions and including a driving motor 210 configured to generate rotation force and a power conversion unit 220 connected to the guide bracket 100 and configured to convert the rotation force of the driving motor 210 into rectilinear motion, and a tilting mechanism 300 connected to the power conversion unit 220 to be moved together with the sliding mechanism 200 and including a propeller motor 331 configured to be tilted in the upward and downward directions and an angle conversion unit 310 connected to the propeller motor 331 and the power conversion unit 220 to tilt the propeller motor 331 using the rotation force transmitted from the power conversion unit 220.

An aircraft fuselage M, which is configured for taking off and landing vertically, may have wings W configured to generate lift force when the aircraft flies at a high speed, and the guide bracket 100 may be provided at each of the wings W. The guide bracket 100 may be provided at the aircraft fuselage M or other external portions, such as a boom, in addition to the wings W of the aircraft fuselage M.

The sliding mechanism 200 including the driving motor 210 configured to generate rotation force and the power conversion unit 220 configured to convert the rotation force of the driving motor 210 into the rectilinear motion is provided in the guide bracket 100. Here, a guide rail 110 extending in the forward and rearward directions may be provided in the guide bracket 100, and the driving motor 210 of the sliding mechanism 200 may be mounted on the guide rail 110 to be slidable and to be moved along the guide rail 110. The guide rail 110 extends along the guide bracket 100 in the forward and rearward directions, and the driving motor 210 is provided on the guide rail 110 by a sliding block 211 and is thus moved along the guide rail 110 in the forward and rearward directions. The power conversion unit 220 is connected to the driving motor 210, and accordingly, the sliding mechanism 200 may be rectilinearly moved by the rotation force of the driving motor 210. In more detail, the power conversion unit 220 may include nut portions 221 fixed to the guide bracket 100, and a screw portion 222 configured to extend from the driving motor 210 along the guide bracket 100, to penetrate the nut portions 221 and to be connected to the angle conversion unit 310. Accordingly, the power conversion unit 220 includes the nut portions 221 and the screw portion 222, the nut portions 221 are fixed to the guide bracket 100, and the screw portion 222 extends from the driving motor 210 and is provided to penetrate the nut portions 221. Accordingly, when the driving motor 210 is operated and thus the screw portion 222 is rotated, the screw portion 222 connected to the nut portions 221 reciprocates in the forward and rearward directions, and thus the entirety of the sliding mechanism 200 including the motor 210 may be moved. Furthermore, because the angle conversion unit 310 is connected to the screw portion 222, the tilting mechanism 300 including the angle conversion unit 310 is also moved in the forward and rearward directions upon movement of the screw portion 222.

The tilting mechanism 300 is connected to the screw portion 222 of the power conversion unit 220 to be moved in the forward and rearward directions, and includes the propeller motor 331 configured to be tilted in the upward and downward directions and the angle conversion unit 310 connected to the propeller motor 331 and the power conversion unit 220 to tilt the propeller motor 331 using the rotation force transmitted from the power conversion unit 220. Here, a propeller including a plurality of propeller blades 331a is provided on the propeller motor 331 to generate thrust when the propeller is rotated, and the angle conversion unit 310 adjusts the tilting angle of the propeller motor 331 using the rotation force transmitted from the power conversion unit 220. The angle conversion unit 310 is connected to the power conversion unit 220, and thus the angle conversion unit 310 and the power conversion unit 220 are simultaneously operated using the rotation force generated by the driving motor 210. That is, when the driving motor 210 of the sliding mechanism 200 is operated, the power conversion unit 220 converts the rotation force of the driving motor 210 into rectilinear motion to move the sliding mechanism 200 in the forward and rearward directions, and when the tilting mechanism 300 is moved together with the sliding mechanism 200, the angle conversion unit 310 tilts the propeller motor 331 using the rotation force transmitted from the power conversion unit 220. Accordingly, the sliding mechanism 200 and the tilting mechanism 300 are simultaneously operated when the driving motor 210 is operated, and the rectilinear movement and the tilting angle adjustment of the propeller motor 331 are simultaneously performed through the interworking relationship between the sliding mechanism 200 and the tilting mechanism 300.

The tilting mechanism 300 will be described in more detail. As shown in FIG. 4 and FIG. 5, the tilting mechanism 300 further includes a movable bracket 320 provided on the guide bracket 100 by the angle conversion unit 310 connected to the power conversion unit 220 to be rectilinearly moved in the forward and rearward directions, and a tilting bracket 330 configured such that the propeller motor 331 is mounted thereon, and provided on the movable bracket 320 by the angle conversion unit 310 such that the angle of the tilting bracket 330 is changed.

That is, the movable bracket 320 is connected to the power conversion unit 220 by the angle conversion unit 310, and is thus rectilinearly moved in the forward and rearward directions together with the sliding mechanism 200 when the sliding mechanism 200 is rectilinearly moved. The tilting bracket 330 is configured such that the propeller motor 331 is mounted thereon, and is provided on the movable bracket 320 by the angle conversion unit 310. Accordingly, the tilting bracket 330 is rectilinearly moved in the forward and rearward directions together with the movable bracket 320, and simultaneously, the angle of the tilting bracket 330 is changed by the angle conversion unit 310 and thus changes the position of the propeller motor 331 when the movable bracket 320 is rectilinearly moved.

In more detail, guide rods 120 configured to extend in the forward and rearward directions are provided at the sides of the guide bracket 100, and the movable bracket 320 is mounted on the guide rods 120 to be slidably movable therealong. The guide rods 120 extend along the guide bracket 100 in the forward and rearward directions, and the movable bracket 320 is provided on the guide rods 120 by sliders S and may thus be moved along the guide rods 120 in the forward and rearward directions. The sliders S may be fixed to the movable bracket 320, and may function as brackets on which the angle conversion unit 310 is provided.

The width of the movable bracket 320 in the lateral direction may be greater than the width of the guide bracket 100 in the lateral direction and thus, the movable bracket 320 may be spaced from the guide bracket 100 when the movable bracket 320 is moved forwards, and may be inserted into the guide bracket 100 to overlap the guide bracket 100 when the movable bracket 320 is moved rearwards thereof. Therefore, when the movable bracket 320 is moved forwards or rearwards with respect to the guide bracket 100, interference between the movable bracket 320 and the guide bracket 100 may be avoided. Furthermore, as shown in FIG. 3, when the movable bracket 320 is moved rearwards, the movable bracket 320 is inserted into the guide bracket 100 to overlap the guide bracket 100, and thus support stiffness due to contact between the movable bracket 320 and the guide bracket 100 is ensured.

The angle conversion unit 310 includes a worm screw 311 configured to be rotated by the rotation force transmitted from the power conversion unit 220, and a worm wheel 312 configured to be engaged with the worm screw 311 and to be coupled to the tilting bracket 330 to change the angle of the tilting bracket 330 when the worm wheel 312 is rotated due to the rotation of the worm screw 311.

Here, the worm screw 311 is connected to one end portion of the screw portion 222 of the power conversion unit 220 and thus rotated with the screw portion 222, and the worm wheel 312 is coupled to the tilting bracket 230 and rotatably mounted on the movable bracket 320 to be engaged with the worm screw 311. Accordingly, the tilting angle of the tilting bracket 330, on which the propeller motor 331 is mounted, may be changed due to the rotation of the worm wheel 312 engaged with the worm screw 311 when the worm screw 311 is rotated using the rotation force transmitted from the power conversion unit 220 caused by the operation of the driving motor 210. Here, the gear teeth of the worm screw 311 and the worm wheel 312 may be configured such that the tilting angle of the tilting bracket 330 becomes 90° when the sliding mechanism 200 is completely moved in the forward or rearward direction thereof.

Furthermore, the worm screw 311 is rotatably provided on the movable bracket 320 and coupled to the power conversion unit 220, and may thus be rotated simultaneously with the power conversion unit 220. That is, the worm screw 311 may be provided on the movable bracket 320 by the above-described sliders S. Accordingly, the worm screw 311 is coupled to the power conversion unit 220 and thus rotated simultaneously with the power conversion unit 220, and is moved in the forward and rearward directions together with the sliding mechanism 200. Furthermore, the worm screw 311 is provided on the movable bracket 320 by the sliders S to be moved in the forward and rearward directions together with the movable bracket 320, and is rotatably mounted on the sliders S so that the rotation motion of the worm screw 311 is smoothly performed.

Furthermore, a center shaft 312a extending from the center portion of the worm wheel 312 is provided to penetrate the tilting bracket 330 and is integrally coupled to the tilting bracket 330, and the center shaft 312a is provided to penetrate the movable bracket 320 and is rotatably mounted on the movable bracket 320. That is, because the center shaft 312a of the worm wheel 312 is provided to penetrate the tilting bracket 330 and is integrally coupled to the tilting bracket 330, the worm wheel 312 and the tilting bracket 330 may be rotated together, and because the center shaft 312a of the worm wheel 312 is provided to penetrate the movable bracket 320 and is rotatably mounted on the movable bracket 320, tilting of the tilting bracket 330, on which the propeller motor 331 is mounted, may be adjusted on the movable bracket 320. Here, the portion of the movable bracket 320, which the center shaft 312*a* of the worm wheel 312 is provided to penetrate, may be mounted on the movable bracket 320 by a bearing holder H.

The worm wheel 312 is engaged with the worm screw 311 in the state in which the worm wheel 312 is located on the worm screw 311, and accordingly, the tilting bracket 330 coupled to the worm wheel 312 may be smoothly tilted without interfering with the worm screw 311.

The tilting mechanism 300 is configured such that the propeller motor 311 is disposed vertically when the sliding mechanism 200 is inserted into the guide bracket 100 and the propeller motor 311 is disposed horizontally when the sliding mechanism 200 is withdrawn from the guide bracket 100, and accordingly, the direction in which thrust is generated by the operation of the propeller motor 331 may be changed.

That is, as shown in FIG. 6, when the sliding mechanism 200 is inserted into the guide bracket 100, the propeller motor 331 is disposed vertically and thus the propeller including the propeller blades 331*a* enters a state appropriate for cruising. When the sliding mechanism 200 is inserted into the guide bracket 100, the propeller including the propeller blades 331*a* is located adjacent to the wing W, and thus the thrust generated by operating the propeller motor 331 is effectively applied to the wing W and flight performance is improved.

In contrast, as shown in FIG. 7, when the sliding mechanism 200 is withdrawn from the guide bracket 100, the propeller motor 331 is disposed horizontally and thus the propeller including the propeller blades 331*a* enters a state appropriate for hovering. When the sliding mechanism 200 is withdrawn from the guide bracket 100, the propeller including the propeller blades 331*a* is located away from the wing W, and thus the thrust generated by operating the propeller motor 331 is not interfered with the wing W and thrust loss is reduced.

Therefore, when the sliding mechanism 200 is withdrawn from the guide bracket 100, the propeller including the propeller blades 331*a* of the tilting mechanism 300 is spaced from the aircraft fuselage M. Thus, a distance between the propeller including the propeller blades 331*a* and the wing W may be ensured by setting the size of the propeller blades 331*a* or the withdrawal distance of the sliding mechanism 200. Accordingly, the propeller including the propeller blades 331*a* is spaced from the wing W of the aircraft fuselage when the sliding mechanism 200 is withdrawn from the guide bracket 100, and thus loss of the thrust generated by the rotation of the propeller including the propeller blades 331*a* due to interference with the wing W is prevented.

The propeller tilting apparatus of air mobility having the above-described structure simultaneously performs the movement of the sliding mechanism 200 and the tilting operation of the tilting mechanism 300 using one driving motor 210, and thus changes the angle of the propeller including the propeller blades 331*a* simultaneously with the forward or rearward movement of the propeller. Accordingly, the structure configured to move the position of the propeller including the propeller blades 331*a* is simplified, and thrust loss of the propeller including the propeller blades 331*a* in a hovering or cruising mode is prevented.

As is apparent from the above description, a propeller tilting apparatus of air mobility according to various exemplary embodiments of the present invention simultaneously performs movement of a sliding mechanism and tilting of a tilting mechanism using one driving motor, and thus changes the angle of a propeller simultaneously with the forward or rearward movement of the propeller. Accordingly, a structure configured to move the position of the propeller is simplified, and thrust loss of the propeller in a hovering or cruising mode is prevented.

In an exemplary embodiment of the present invention, a controller is connected to the driving motor 210 to control the operations thereof.

In addition, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method disclosed in the aforementioned various exemplary embodiments of the present invention.

The aforementioned invention can also be embodied as computer readable codes on a computer readable recording medium. The computer readable recording medium is any data storage device that can store data which can be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc. and implementation as carrier waves (e.g., transmission over the Internet).

In an exemplary embodiment of the present invention, each operation described above may be performed by a control device, and the control device may be configured by multiple control devices, or an integrated single control device.

In an exemplary embodiment of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A propeller tilting apparatus of air mobility, the propeller tilting apparatus comprising:
    a guide bracket;
    a sliding mechanism provided in the guide bracket to be movable in forward and rearward directions of the guide bracket, and including:
        a driving motor configured to generate rotation force; and
        a power conversion unit connected to the guide bracket and engaged to the driving motor and configured to convert the rotation force of the driving motor into a rectilinear motion of the sliding mechanism; and
    a tilting mechanism engaged to the power conversion unit to be moved with the sliding mechanism, and including:
        a propeller motor configured to be tilted in a predetermined direction; and
        an angle conversion unit connected to the propeller motor and the power conversion unit to tilt the propeller motor using the rotation force received from the power conversion unit.

2. The propeller tilting apparatus of the air mobility according to claim 1,
    wherein a guide rail extending in the forward and rearward directions is provided in the guide bracket, and
    wherein the driving motor of the sliding mechanism is mounted on the guide rail to be slidable along the guide rail.

3. The propeller tilting apparatus of the air mobility according to claim 1,
    wherein the power conversion unit includes at least a nut portion fixed to the guide bracket, and a screw portion extending from the driving motor along the guide bracket, and
    wherein the screw portion is aligned to penetrate the at least a nut portion, to be engaged to the at least a nut portion, and then to be connected to the angle conversion unit.

4. The propeller tilting apparatus of the air mobility according to claim 3, wherein the angle conversion unit includes:
    a worm screw engaged to the screw portion and rotated by the rotation force transmitted from the screw portion of the power conversion unit; and
    a worm wheel engaged with the worm screw and connected to a tilting bracket of the tilting mechanism to change an angle of the tilting bracket when the worm wheel is rotated according to a rotation of the worm screw rotated by the rotation force transmitted from the power conversion unit,
    wherein the propeller motor is mounted on the tilting bracket.

5. The propeller tilting apparatus of the air mobility according to claim 1, wherein the tilting mechanism further includes:
    a movable bracket provided on the guide bracket by the angle conversion unit connected to the power conversion unit to be rectilinearly moved in the forward and rearward directions; and
    a tilting bracket on which the propeller motor is mounted, wherein the tilting bracket is provided on the movable bracket by the angle conversion unit so that an angle of the tilting bracket is changed.

6. The propeller tilting apparatus of the air mobility according to claim 5,
    wherein at least a guide rod extending in the forward and rearward directions is provided at a corresponding side of the guide bracket, and
    wherein the movable bracket is mounted on the at least a guide rod to be slidably movable along the at least a guide rod.

7. The propeller tilting apparatus of the air mobility according to claim 5,
    wherein a width of the movable bracket in a lateral direction thereof is greater than a width of the guide bracket in a lateral direction thereof and thus, the movable bracket is spaced from the guide bracket when the movable bracket is moved in the forward direction, and allows the guide bracket to be inserted into the movable bracket to overlap the guide bracket when the movable bracket is moved in the rearward direction.

8. The propeller tilting apparatus of the air mobility according to claim 5, wherein the angle conversion unit includes:
    a worm screw rotated by the rotation force transmitted from the power conversion unit; and
    a worm wheel engaged with the worm screw and connected to the tilting bracket to change the angle of the tilting bracket when the worm wheel is rotated according to a rotation of the worm screw rotated by the rotation force transmitted from the power conversion unit.

9. The propeller tilting apparatus of the air mobility according to claim 8,
    wherein the worm screw is rotatably provided on the movable bracket and coupled to the power conversion unit to be rotated with the power conversion unit.

10. The propeller tilting apparatus of the air mobility according to claim 9,
    wherein the power conversion unit includes at least a nut portion fixed to the guide bracket, and a screw portion extending from the driving motor along the guide bracket, and
    wherein the screw portion is aligned to penetrate the at least a nut portion, to be engaged to the at least a nut portion, and then to be engaged to the worm screw of the angle conversion unit.

11. The propeller tilting apparatus of the air mobility according to claim 8,
    wherein a center shaft extending from a center portion of the worm wheel is provided to penetrate the tilting bracket and is integrally connected to the tilting bracket, and the center shaft is provided to penetrate the movable bracket and is rotatably mounted on the movable bracket.

12. The propeller tilting apparatus of the air mobility according to claim 8, wherein the worm wheel is engaged with the worm screw in a state in which the worm wheel is located on the worm screw.

13. The propeller tilting apparatus of the air mobility according to claim 1,
wherein the tilting mechanism is configured such that the propeller motor is disposed in a first direction when the sliding mechanism is inserted into the guide bracket, and the propeller motor is disposed in a second direction when the sliding mechanism is withdrawn from the guide bracket, and accordingly, a direction in which thrust is generated by operation of the propeller motor is changed.

14. The propeller tilting apparatus of the air mobility according to claim 1,
wherein the guide bracket is provided on a wing of an aircraft fuselage, and a propeller including a plurality of propeller blades is provided on the propeller motor; and
wherein the propeller is configured to be spaced from the wing of the aircraft fuselage when the sliding mechanism is withdrawn from the guide bracket.

* * * * *